U. L. TAYLOR.
LUBRICATOR FOR AXLE SPINDLES.
APPLICATION FILED JUNE 12, 1914.
1,177,217.
Patented Mar. 28, 1916.
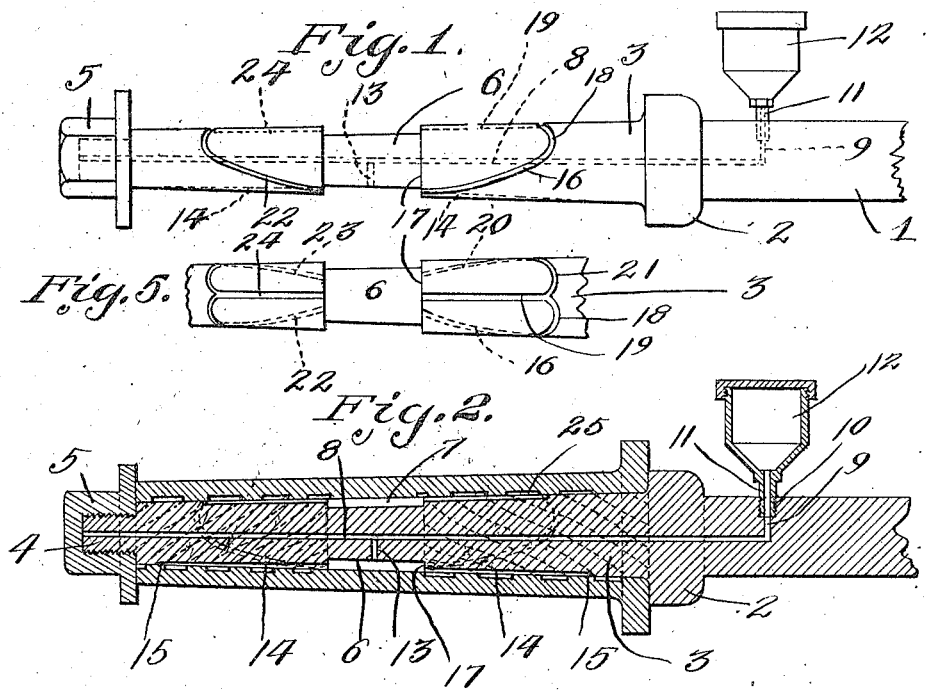
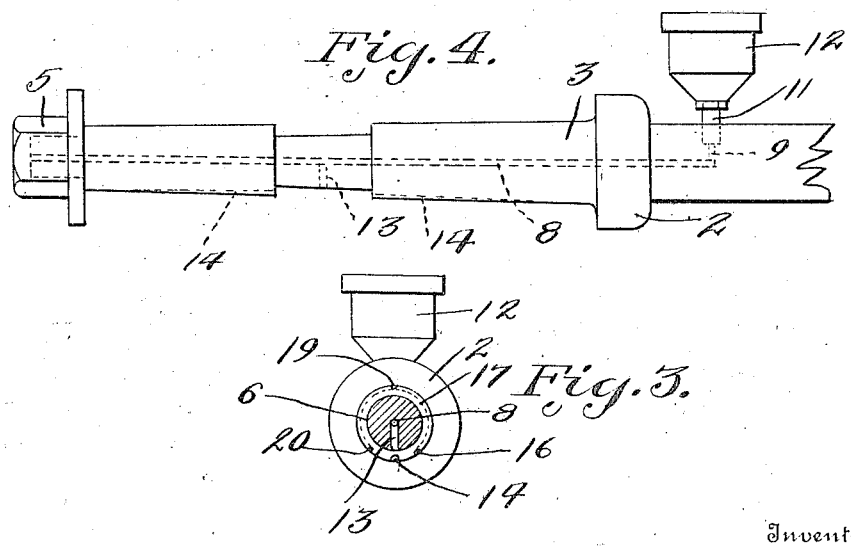
Witnesses
Philip Terrell
Francis T. Boswell
Inventor
U. L. Taylor
By D. Swift & Co.
his Attorneys

UNITED STATES PATENT OFFICE.

ULYSSES LAFAYETTE TAYLOR, OF PINE BLUFF, ARKANSAS.

LUBRICATOR FOR AXLE-SPINDLES.

1,177,217.  Specification of Letters Patent.  Patented Mar. 28, 1916.

Application filed June 12, 1914. Serial No. 844,680.

*To all whom it may concern:*

Be it known that I, ULYSSES LAFAYETTE TAYLOR, a citizen of the United States, residing at Pine Bluff, in the county of Jefferson and State of Arkansas, have invented a new and useful Lubricator for Axle-Spindles; and I do hereby declare the following to be a full, clear, and exact description of the invention, such as will enable others skilled in the art to which it appertains to make and use the same.

This invention relates to a lubricator for axle spindles, and an object in view is the provision of a device of this design including efficient and practical features of construction.

In practical fields the details of construction may necessitate alterations, falling within the scope of what is claimed.

The invention comprises further features and combination of parts, as hereinafter set forth, shown in the drawings and claimed.

In the drawings:—Figure 1 is a view showing the axle spindle provided with a construction of the lubricating means. Fig. 2 is a sectional view. Fig. 3 is a transverse sectional view. Fig. 4 is a view of the axle spindle showing the grooves, 16, 19 and 20, 22 and 23 and 24 omitted. Fig. 5 is a plan view of the fragmentary portion of the axle spindle.

Referring to the drawings, 1 designates a portion of the axle having the usual integral collar 2, beyond which the spindle 3 projects provided with the usual reduced end 4 for the reception of the wheel retaining nut 5. The central portion of the spindle is provided with a contracted portion 6 forming a channel 7 between the contracted portion and the inner circumference of the bore of the wheel. Extending axially through the spindle is an oil duct 8 terminating in a right angle passage 9, which extends radially upward through the axle 1 having interior threads, as shown at 10 to receive the threaded extension 11 of the oil cup 12. The oil duct 8 is in communication with a lateral oil duct 13, which in turn is in communication with the channel 7. The under portions of the spindle upon each side of the channel are provided with oil grooves 14, the end portions 15 of which gradually taper or diminish and merge into the surface of the spindle. An oil groove 16 extends from the shoulder 17 upon an inclination and provided with a return bend 18, and beyond the bend 18, the groove 16 merges into the groove 19, which terminates adjacent the shoulder 17. A groove 20 extends from the shoulder 17 at a point opposite the beginning of the groove 16 and is provided with a return bend 21 and also merges into the groove 19. The spindle on the other side of the channel is provided with grooves 22 and 23 and the groove 24 into which the grooves 22 and 23 merge, in a manner similar to the construction of the grooves 16, 20 and 19. The inner circumference of the bore of the wheel is suitably rifled as shown at 25, at angles different to the angles of said grooves 22, 23, 24, 16, 19 and 20, and act to convey the lubricant back to the upper portion of the spindle, and returned to the channel 7, where it is again picked up when it reaches the lower portion of the channel. The grooves 22 and 23, 16, 19 and 20 also act to return the lubricant back to the channel.

The invention having been set forth, what is claimed as new and useful is:—

In combination with an axle spindle provided with a substantially centrally disposed contracted portion forming a channel or lubricant pocket, a duct extending axially through the spindle terminating in an upwardly extending right angled passage having threaded connections through an oil cup, a passage communicating with the pocket and the axially arranged duct, said spindle on its upper surface on each side of the pocket being provided with an elongated oil groove extending axially, one of said oil grooves extending toward the axle body and terminating in looped branch oil grooves curved laterally and downwardly and under the spindle and reverting back toward and communicating with said pocket, the other elongated axially arranged oil groove extending toward the end of the spindle and terminating in branch oil grooves being curved laterally in opposite directions downwardly and under the spindle and reverting back to said pocket, a hub having oil grooves on the inner circumference of its bore and being rifled from the axle body toward said pocket, said hub having additional oil grooves upon the inner circumference of its bore and being rifled from the outer end of the hub toward said pocket.

In testimony whereof I have signed my name to this specification in the presence of two subscribing witnesses.

ULYSSES LAFAYETTE TAYLOR.

Witnesses:
M. H. NORTON,
A. B. PATTON.